Nov. 1, 1966 E. F. KAISER 3,283,298
MEANS TO INDICATE DRIVE CONDITION OF MULTI-SPEED
TRANSFER CASE FOR FOUR-WHEEL-DRIVE VEHICLES
Filed March 25, 1963 2 Sheets-Sheet 1

INVENTOR.
Edgar F. Kaiser
BY
Harness, Dickey & Pierce
ATTORNEYS.

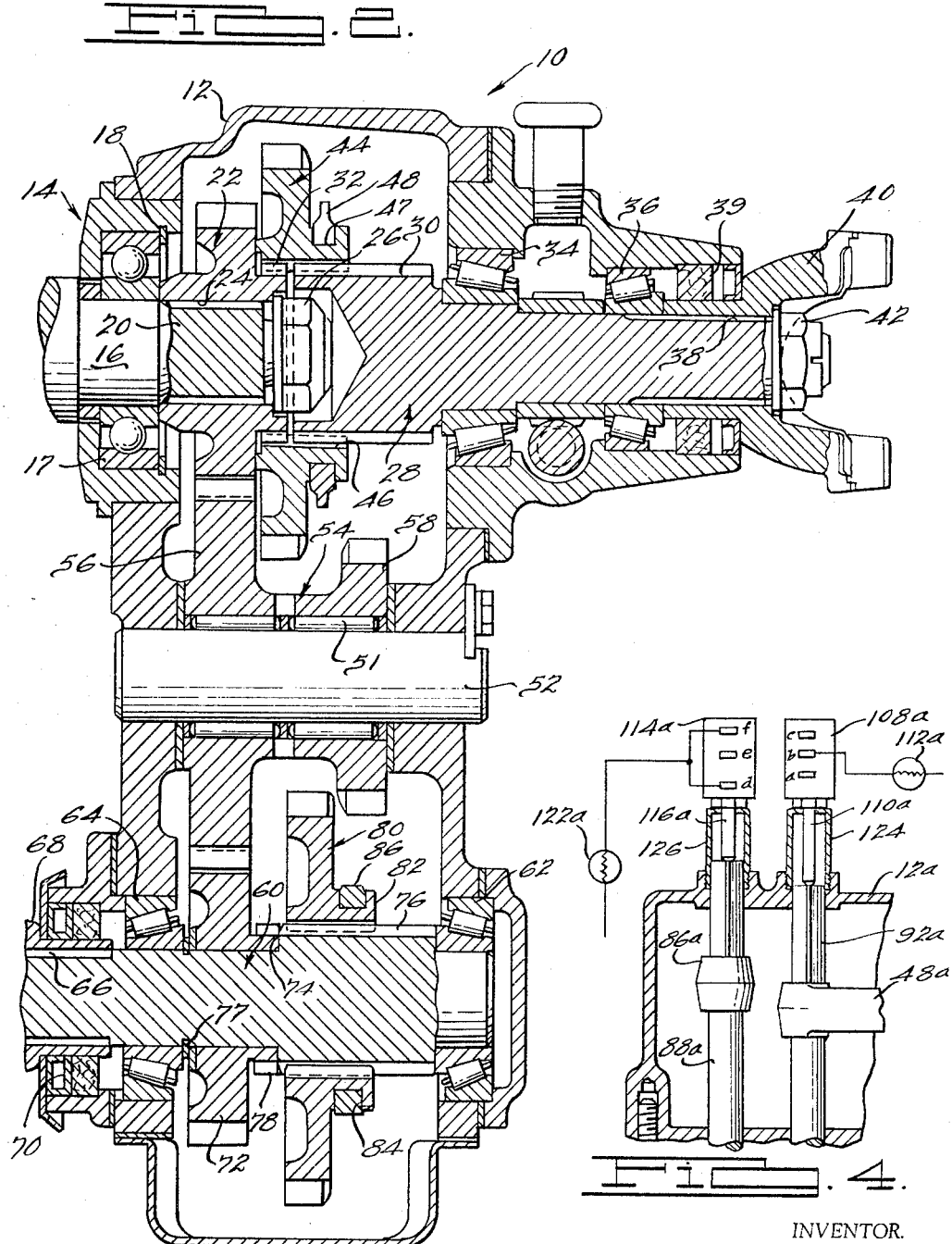

3,283,298
MEANS TO INDICATE DRIVE CONDITION OF MULTI-SPEED TRANSFER CASE FOR FOUR-WHEEL-DRIVE VEHICLES
Edgar F. Kaiser, Lafayette, Calif., assignor to Kaiser Jeep Corporation, Toledo, Ohio, a corporation of Nevada
Filed Mar. 25, 1963, Ser. No. 267,528
8 Claims. (Cl. 340—52)

This invention relates to a transfer case for an automotive vehicle, and more particularly to a transfer case having apparatus for providing an indication of its operative condition.

In general, a transfer case is utilized in a 4-wheel drive automotive vehicle to selectively transmit power to the front wheels. Ordinarily the transfer case is powered through a transmission of conventional design and can be constructed to transmit power at preselected ratios to the rear wheels and can be selectively engaged to transmit power at similar ratios to the front wheels. Thus, in accordance with common practice, the transfer case can be placed in two-wheel, i.e. rear wheel, drive only in high, low or neutral gear ranges and can also be placed in 4-wheel drive, i.e. front and rear wheels, in either high or low gear ratio. With such a variety of operating conditions it is desirable that the operator be able to quickly ascertain, especially in adverse situations, the condition of the transfer case.

It is an object of this invention, therefore, to provide a novel transfer case in which an indication of the operating conditions thereof is provided to the operator of the vehicle.

It is a further object of this invention to provide a novel transfer case in which a quickly ascertainable light indication of the operating conditions thereof is provided to the operator of the vehicle.

Other objects, features, and advantages of the present invention will become apparent from the subsequent description and the appended claims, taken in conjunction with the accompanying drawings, in which:

FIGURE 2 is a sectional view of the transfer case of FIGURE 1 taken substantially along the line 2—2 of FIGURE 1 and shown in assembly relationship with a transmission partially shown;

FIGURE 4 is a sectional view similar to that of FIGURE 3 depicting a modification of the apparatus shown in FIGURE 3; and FIGURE 5 is a view of a portion of a vehicle chassis for a four-wheel drive vehicle.

Figure 1:
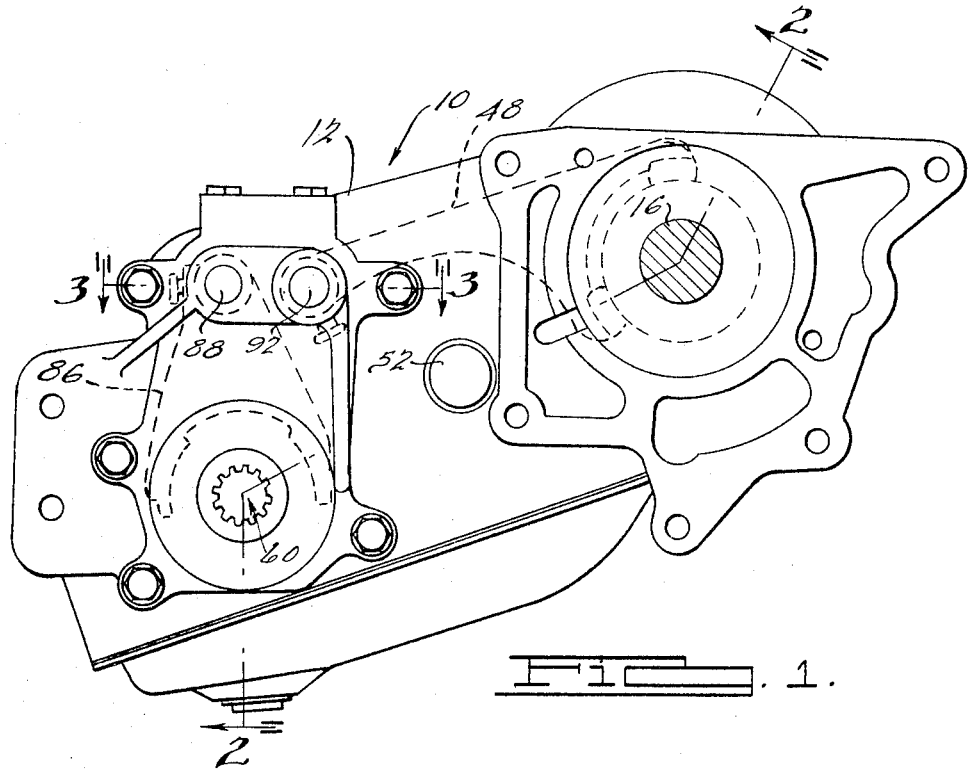
FIGURE 1 is a front elevational view of a transfer case embodying the features of this invention.

Looking now to the drawings, a portion of a vehicle chassis for a four-wheel drive vehicle is generally indicated by the numeral 11 and includes a transfer case 10 which is connected by conventional means to a transmission 14. Both the transfer case 10 and transmission 14 are driven by an engine generally indicated by the numeral 15. The chassis 11 includes a set of rear wheels 19 and a differential 21 with a drive shaft 23 connecting the rear wheel differential 21 to the transfer case 10. A pair of front wheels 25 are driven by a differential 27 which is connected to the transfer case 10 by means of a drive shaft 29, the transfer case 10 which embodies features of the present invention comprises an outer case assembly 12. The transmission 14 (only partially shown in FIGURE 2) is connected to the power plant 15 of the vehicle and transmits power therefrom via a transmission output shaft 16 which is rotatably supported at the outer end of the transmission assembly 14 by a ball bearing assembly 17. The ball bearing assembly 17 is disposed within a recess at the rearward end of the housing of the transmission assembly 14 and is axially secured therein by a snap ring 18.

The transmission output shaft 16 has a splined portion 20 extending into the confines of the case assembly 12 of transfer case 10, and a drive gear 22 has a splined central bore 24 which is disposed in splined engagement with the splined portion 20 of the output shaft 16. Drive gear 22 is axially held to the transmission output shaft 16 by means of a nut and washer assembly 26 which is threadably engaged upon the threaded terminus of the transmission output shaft 16.

Axially spaced from and located coaxially relative to the drive gear 22 is a rear wheel drive spindle 28 which has an enlarged diameter splined portion 30 at one end disposed in juxtaposition with a reduced diameter externally splined portion 32 of the drive gear 22. The rear wheel drive spindle 28 is rotatably secured within the case or housing assembly 12 via a pair of axially spaced roller bearings 34 and 36. The rear wheel drive spindle 28 has a reduced diameter splined portion 38 located proximate the end opposite the portion 30 and has secured thereto in splined engagement a yoke 40 of a universal joint assembly (partially shown) which is connected to the rear wheels 19 of the vehicle via the propeller shaft 23 and other conventional apparatus. The yoke 40 is axially restrained upon the splined portion 38 by means of a nut and washer assembly 42 which is threadably engaged upon the threaded extremity proximate to the portion 38 of the rear wheel drive spindle 28. An annularly extending seal assembly 39 located in housing assembly 12 provides a seal between the yoke 40 and the housing assembly 12.

A rear wheel drive and connecting gear member 44 has a splined bore 46 which is matable with the enlarged splined portion 30 of the rear wheel drive spindle 28 and is likewise matable with the reduced diameter splined portion 32 of the drive gear 22. The gear member 44 has an annular groove 47 for receiving a pair of fingers of a bifurcated member 48 which can be manipulated, in a manner to be described, to move the gear member 44 axially along the splined portions 30 and 32. In the position as shown in FIGURE 2, with the gear member 44 in its forwardmost position, the drive gear 22 is then connected to the rear wheel drive spindle 28 thereby providing for power transfer to the rear wheels via the yoke 40 of the universal joint assembly. By moving the gear member 44 axially rearwardly along the splined portion 30 and out of engagement with the splined portion 32, the drive gear 22 is uncoupled from the rear wheel drive spindle 28, thereby disconnecting the power from the rear wheels. Thus in the two positions just described, the rear wheel drive and connecting gear member 44 can be moved to couple the drive gear 22 directly to the rear wheel drive spindle 28, providing direct or high drive to the rear wheels, or the gear member 44 can be moved rearwardly to a neutral position whereby no power is transmitted to the rear wheels.

Fixed within the housing assembly 12 of transfer case 10 and eccentrically spaced from the rear wheel drive spindle 28 and the transmission output shaft 16 is a countershaft 52. Rotatably mounted via bearing 51 on the countershaft 52 is an intermediate gear member 54 which has a first gear section 56 maintained continuously in geared engagement with the drive gear 22. The intermediate gear member 54 also has a second gear section 58 which serves a purpose to be described.

Eccentrically displaced from the countershaft 52 is a front wheel drive spindle 60 which is rotatably supported within the housing assembly 12 via a pair of axially spaced roller bearing assemblies 62 and 64. The axially forward end of the spindle 60 terminates in a splined portion 66 onto which is matably splined a yoke 68 (partially shown) of a universal joint assembly (not shown) which is connected via the propeller shaft 29 and other appropriate apparatus to the front wheels 25 of the vehicle. An annularly extending seal assembly 70 located in the housing assembly 12 provides a seal between the yoke 66 and the housing assembly 12.

A front wheel drive gear 72 is rotatably supported upon the spindle 60 and is maintained continuously in engagement with the first gear section 56 of the intermediate gear 54 and has the same number of teeth as the drive gear 22. The drive gear 72 is substantially axially restrained on opposite sides by a shoulder 74 on the front wheel drive spindle 60 defined by an enlarged diameter splined portion 76 and by a snap ring 77 secured to the spindle 60. The front wheel drive gear 72 has a reduced diameter splined portion 78 of the same size as splined portion 76 and is disposed in juxtaposition thereto.

In the position of the gears in the transfer case 10 as shown in FIGURE 2, as the drive gear 22 is rotated via the transmission output shaft 16, the front wheel drive gear 72 is rotated at the same speed by the drive gear 22 via the first gear section 56 of the intermediate gear member 54. Since, in the position as shown in FIGURE 2, the front wheel drive gear 72 is free to rotate about the front wheel drive spindle 60, no power is transmitted to the front wheels.

A front wheel drive and connecting gear member 80 is similar to gear member 44 and is matably splined to the enlarged diameter splined portion 76 of the front wheel drive spindle 60 via a splined bore 82. The gear member 80 has an annular groove 84 in which is disposed a pair of fingers of a bifurcated member 86 which can be manipulated whereby the position of the gear member 80 can be adjusted axially along the splined portion 76.

By moving the front wheel drive and connecting gear member 80 to its forwardmost position, the splined bore 82 is placed in splined engagement with the reduced diameter splined portion 78 and the enlarged diameter splined portion 76, thereby coupling the front wheel drive gear 72 to the front wheel drive spindle 60 and hence providing for the transmission of power to the front wheels from the drive gear 22. The transfer case 10 can be again placed into two-wheel drive by simply returning the gear 80 to its neutral position (as shown in FIGURE 2), disconnecting the gear 72 from spindle 60.

With the gear 80 in its neutral position, the rear wheels can be connected to the transmission 14 through a low gear ratio in the transfer case 10 by moving the rear wheel drive and connecting gear member 44 axially rearwardly along splined portion 30 and into engagement with the second gear section 58 of the intermediate gear 54. At this time, power is transmitted to the rear wheels from transmission 14 via the splined connection between output shaft 16 and drive gear 22, the geared engagement of drive gear 22 with the first gear section 56 and of the second gear section 58 with connecting gear 44, and the splined connection between gear 44 and spindle 28.

The vehicle can be placed in four-wheel drive through the low gear ratio in the transfer case 10 by moving the front drive and connecting gear member 80 to its axially rearwardmost position and into engagement with the second gear section 58 of the intermediate gear member 54. At this time, power is transmitted to the front wheels from the drive gear 22 via the geared engagement of the drive gear 22 with the first gear section 56 and of the second gear section 58 with the front wheel drive and connecting gear 80 and the splined connection between gear 80 and front wheel drive spindle 60.

Figure 3:
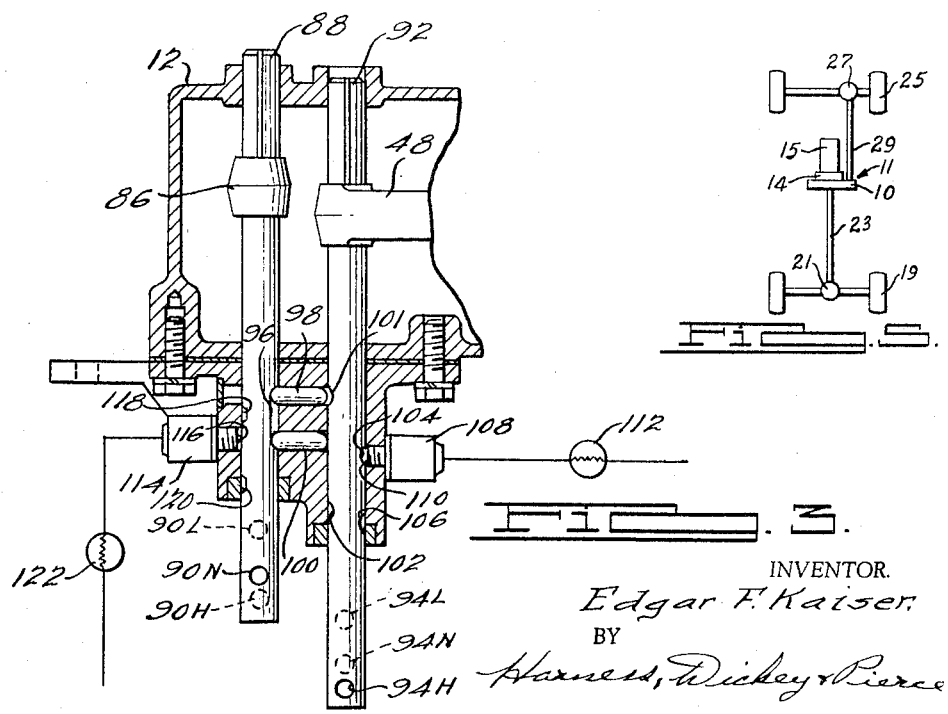
FIGURE 3 is a sectional view of the transfer case of FIGURE 1 taken substantially along the line 3—3 of FIGURE 1.

In order that the operator be provided with some visual indication of the operative condition of the transfer case 10, a shift and indicating mechanism is provided as shown in FIGURE 3. In FIGURE 3, a front shift rod 88 is slidably supported within the housing assembly 12 and has secured thereto the shift fork 86 which, as previously described, has a pair of fingers disposed within the annular slot 84 in the front drive and connecting gear member 80. The front shift rod 88 has its forward end extending outwardly beyond the forward face of the housing assembly 12 and has a transverse through bore 90N to facilitate coupling to a suitable linkage (not shown), whereby axial movement of the front shift rod 88, and hence of connecting gear 80, can be accomplished.

A rear shift rod 92 is spaced from the front shift rod 88 and is likewise slidably supported within the housing assembly 12 and has secured thereto the shifting fork 48 which, as previously described, has a pair of fingers disposed within the annular slot 47 in the rear drive and connecting gear member 44. The rear shift rod 92 has its forward end extending outwardly beyond the forward face of the housing assembly 12 and has a transversely extending through bore 94H to facilitate engagement with a suitable linkage (not shown) whereby the rod 92, and hence the connecting gear 44, can be moved axially. With the transfer case 10 as previously described, it can be seen that without some type of interlock system it would be possible to place the vehicle in front wheel drive only, i.e., connecting gear 44 in the neutral position, or to inadvertently connect the rear wheels to the transmission 14 in one gear ratio through the transfer case 10 and the front wheels in a different gear ratio. In FIGURE 3 an interlock system to be presently described is shown which permits engagement through the transfer case of the front wheels only when the rear wheels are engaged and which prevents engagement of the front and rear wheels at different gear ratios.

In FIGURE 3 the rear shift rod 88 is provided with an elongated, axially extending slot 96. A pair of axially spaced interlocking bars 98 and 100 are disposed in channels in the housing 12 and are movable either singularly or simultaneously transversely into the slot 96.

In the position as shown, the front shift rod 88 locates the front drive and connecting gear member 80 in the neutral position as shown in FIGURE 2. By moving the front shift rod 88 forwardly whereby the hole 90N occupies the position indicated by the numeral 90H, the front drive and connecting gear member 80 is moved forwardly coupling the reduced diameter splined portion 78 to the enlarged diameter splined portion 76 thereby placing the vehicle in four-wheel high or direct drive. By moving the front shift rod 88 rearwardly whereby the hole 90N occupies a position indicated by the numeral 90L, the front drive and connecting gear member 80 is moved to its rearwardmost position and into engagement with the second gear section 58 of the intermediate gear member 54 thereby placing the front wheels of the vehicle in low drive.

In the apparatus of FIGURE 3, the rear shift rod 92 is shown in its high or direct drive connecting position whereby the rear wheels of the vehicle are connected to the transmission assembly 14 in direct drive through the transfer case 10. When the rear shift rod 92 is moved axially rearwardly where the hole 94H occupies the position indicated by the numeral 94N, the rear drive and connecting gear member 44 is out of engagement with the splined portion 32 of the drive gear 22, thereby placing the rear wheels in neutral through the transfer case 10. By moving the rear shift rod 92 further forward where the hole 94H is in the position indicated by the numeral 94L, the rear drive and connecting gear member 44 is moved to its axially rearwardmost position and into engagement with the second gear section 58 of the intermediate gear 54, thereby placing the rear wheels in low gear through the transfer case. With the front drive rod 88 in the neutral position as shown in FIGURE 3, the interlock bars are located in the elongated slot 96 in front shift rod 88 and away from the rear shift rod 92 whereby the rear shift rod 92 can be moved from the high gear position, as shown, to either neutral or low as indicated by the numerals 94N and 94L respectively. The rear shift rod 92 is provided with a transversely extending slot 101 which, with the rear shift rod 92 in the high gear position and with the front shift rod 88 in the neutral position, is located in alignment with the interlock bar 98. The slot 101 is of a width just adequate to receive the interlock bar 98. At this time the front shift rod 88 can be moved only axially forwardly to the high position 90H moving the interlock bar 98 out of slot 96 and into slot 101 and moving the front drive and connecting gear member 80 forwardly into engagement with the splined portion 78 of the front drive gear 72. Note that with the rear shift rod 92 in the high position the front shift rod 88 cannot be moved rearwardly into the low position 90L. With the interlock member 98 in engagement with the slot 101, the rear shift rod 92 cannot be moved out of the high position indicated 94H until the front shift rod 88 is moved back into its neutral position 90N. With the front shift rod 88 in the neutral position 90N, as indicated in FIGURE 3, and with the rear shift rod 92 moved rearwardly to the neutral position 94N, the slot 101 is out of alignment with the interlock member 98 thereby preventing movement of the front shift rod 88. As the rear shift rod 92 is moved rearwardly into the low position indicated by the numeral 94L, a transverse slot 102 in rod 92 is then moved into alignment with the interlock member 100. At this time, the front shift rod 88 can then be moved rearwardly with the interlock member 100 being moved transversely out of the slot 96 and into the slot 102 whereby the front shift rod 88 can then be moved into the low position indicated by the numeral 90L. Thus it can be seen that with the interlock system shown, proper shifting of the gears of transfer case 10 is insured.

As previously indicated, it is desirable that some visual indication be provided to the operator of the vehicle whereby the operative condition of the transfer case can easily and quickly be ascertained. Looking again to FIGURE 3, the rear shift rod 92 is provided with a pair of spaced slots 104 and 106. A switch assembly 108, of a conventional design, is disposed in the housing assembly 12 and has a switch actuating member 110 biased outwardly into engagement with the rear shift rod 92. The rear shift rod 92 normally maintains the actuating member 110 in its innermost position with the member 110 moving to an outer position when slots 104 and 106 are moved into alignment therewith. With the actuating member 110 in its outer position, i.e. in slots 104 and 106, the switch 108 is opened. As the slots 104 and 106 are moved out of alignment with the actuating member 110, the rear shift rod 92 moves the actuating member or plunger 110 inwardly, closing the switch 108. The slots 104 and 106 are disposed along the rear shift rod 92 such that the slot 104 is in alignment with the plunger 110 when the shift rod 92 is in the high gear position 94H and the slot 106 is disposed in alignment with the plunger 110 when the rear shift rod 92 is in the low position 94L. Thus with the rear shift rod 92 in either the high or low gear position, the circuit of the switch 108 is caused to be opened. A light 112 located in a position to be readily observed by the operator is connected in series to the switch 108 and is in turn connected to a source of potential such that when the switch 108 is closed the light 112 is on and when the switch 108 is opened the light 112 is off. Thus the light 112 will be on only when the rear shift rod 92 is in the neutral position and will be off when the rear shift rod 92 is in either the "high" or low gear position.

A switch assembly 114, similar to switch assembly 108, and having an actuating member or plunger 116 is disposed in the housing 12 proximate to the front shift rod 88. A pair of slots 118 and 120 are disposed in a front shift rod 88. The slot 118 is moved into alignment with the plunger 116, allowing it to move outwardly, when the front shift rod 88 is in the high position 90H while the slot 120 is moved into alignment with the plunger 116, allowing it to move outwardly, when the front shift rod 88 is in the low position 90L. The switch assembly 114 functions oppositely to the switch assembly 108 such that with the switch plunger 116 in its innermost position the switch 114 is opened and, conversely, with the switch 116 in its outermost position, as when disposed in either of the slots 118 and 120, the switch 114 is closed. Thus with the front shift rod 88 in either the low or high gear position, i.e., indicating the vehicle to be in four-wheel drive, the circuit of the switch 114 is closed. A light 122 located in a position to be readily observed by the operator is serially connected with the switch 114 and to a source of potential such that the light 122 will be on only when the vehicle is in four-wheel drive.

FIGURE 4 shows a modification of apparatus of FIGURE 3 with like components serving similar functions being given the same number with a letter subscript added. Looking now to FIGURE 4, a rear shift rod 92a has a shifting fork 48a attached thereto for shifting the transfer case in the manner similar to that of the rear shift rod 92. A front shift rod 88a has a shifting fork 86a attached thereto and likewise is used to shift the transfer case in a manner similar to the front shift rod 88. The shift rods 88a and 92a are slidably supported in a transfer case housing 12a. A switch assembly 108a is located in a housing extension 124 secured to the housing assembly 12a and located at their rearward end of the rear shift rod 92a. The switch 108a is a three-position switch having first, second and third positions $a$, $b$ and $c$, respectively. The $b$ position is a closed-circuit position, while the positions $a$ and $c$ are open-circuit positions. The switch assembly 108a has a plunger or actuating member 110a which is engageable with rear shift rod 92a and which extends outwardly from the switch assembly 108a and is normally resiliently urged into the $a$ or open-circuit position. The $a$ position corresponds to the rear shift rod 92a being in the high gear position. As the rear shift rod 92a is moved rearwardly into the neutral position, the actuating plunger 110a is moved inwardly causing the switch 108a to be placed in the $b$ or closed-circuit position. At this time a light 112a, which is located proximate the operator to provide a visual indication and which is electrically connected to the switch 108a through the circuit of position $b$, is energized. As the rear shift rod 92a is moved to the low position, the plunger 110a is moved further inwardly to the $c$ position again opening the circuit to the lamp 112a. Since the plunger 110a is urged normally outwardly, as the rear shift rod 92a is moved forwardly to the neutral and high positions, the plunger 110a will be moved outwardly causing the switch to be placed in $b$ and $a$ positions, respectively. Thus the light 112a will be energized when the rear wheels are in neutral through the transfer case 10a and will be deenergized when the rear wheels are either in the low or high-gear position.

A switch 114a is mounted in a housing extension 126 at the rear of the housing assembly 12a and is also a three-position switch having positions $d$, $e$ and $f$. The positions $d$ and $f$ are closed-circuit positions and are each connected to a light 122a located in a position to be readily observed by the operator of the vehicle. The position $d$ is an open-circuit condition. The three-position switch 114a has a plunger member 116a which is normally resiliently urged outwardly from the switch 114a placing the switch normally in the $d$ position. The plunger 116a is normally in engagement with the front shift rod 88a such that with the front shift rod 88a in the high position, the plunger 116a is moved outwardly to place the switch assembly 114a in the $d$ or energized position. With the front shift rod 88a in the neutral position, the plunger member 116a places the switch assembly 114a in the $e$ position, thereby deenergizing the light 122a. Finally, with the front shift rod member 88a in the low position, the plunger 116a places the switch assembly 114a in the f position, thereby again energizing the light 122a. As the front shift rod member 88a is moved forwardly, the plunger 116a is resiliently moved outwardly. Thus the switch assembly 114a causes the lamp 122a to be energized when the front wheels are placed in either low or high gear, i.e., four-wheel drive, and causes the light 122a to be de-energized when the front wheels are in neutral, i.e., two-wheel drive. Thus FIGURE 4 discloses an alternate means of providing an indication to the operator of the condition of the transfer case.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an automotive vehicle having a set of front and a set of rear wheels drivable from a source of power, the combination comprising: a transfer case for selectively coupling the sets of front and rear wheels to the source of power, said transfer case including first coupling means for transmitting power to the set of rear wheels, second coupling means for transmitting power to the set of front wheels, first means being selectively actuable into a first condition for connecting said first coupling means to the source of power and being selectively actuable into a second condition for disconnecting said first coupling means from the source of power said first means including a first movable shift rod, second means being selectively actuable into one condition for connecting said second coupling means to the source of power independent of said first coupling means and being selectively actuable into another condition for disconnecting said second coupling means from the source of power, said second means including a second movable shift rod, first indication means responsive to the positional location of said first shift rod for energizing a light responsively to actuation of said first means into one of said first and said second conditions, and second indicating means responsive to the positional location of said second shift rod for energizing a light responsively to actuation of said second means into one of said one and said another conditions.

2. In an automotive vehicle having a set of front and a set of rear wheels drivable from a source of power, the combination comprising: a transfer case for selectively coupling the sets of front and rear wheels to the source of power, said transfer case including first coupling means for transmitting power to one of the sets of front and rear wheels, second coupling means for transmitting power to the other of the sets of front and rear wheels, a first shift rod selectively movable into a first position for connecting said first coupling means to the source of power and being selectively movable into a second position for disconnecting said first coupling means from the source of power, a second shift rod selectively movable into one position for connecting said second coupling means to the source of power independent of said first coupling means and being selectively movable into another position for disconnecting said second coupling means from the source of power, a first electrical switch having positions for opening and closing a first circuit and being operatively connected with said first shift rod for opening said first circuit with said first shift rod in one of said first and said second positions and for closing said first circuit with said first shift rod in the other of said first and said second positions, and a second electrical switch having positions for opening and closing a second circuit and being operatively connected with said second shift rod for opening said second circuit with said second shift rod in one of said one and said another positions and for closing said second circuit with said second shift rod in the other of said one and said another positions.

3. In an automatic vehicle having a set of front and a set of rear wheels drivable from a source of power, the combination comprising: a transfer case selectively coupling the sets of front and rear wheels to the source of power, said transfer case including a housing assembly, first coupling means disposed in said housing assembly for transmitting power to one of the sets of front and rear wheels, second coupling means disposed in said housing assembly for transmitting power to the other of the sets of front and rear wheels, a first shift rod slidably supported in said housing assembly and selectively movable into a first position for connecting said first coupling means to the source of power and being selectively movable into a second position for disconnecting said first coupling means from the source of power, said first shift rod having a first slot located at a first preselected location in said housing assembly with said first shift rod in one of said first and said second positions and disposed at a first different location with said first shift rod in the other of said first and said second positions, a second shift rod slidably supported in said housing assembly and selectively movable into one position for connecting said second coupling means to the source of power and being selectively movable into another position for disconnecting said second coupling means from the source of power, said second shift rod having a second slot located at a second preselected location in said housing assembly with said second shift rod in one of said one and said another positions and disposed at a second different location with said second shift rod in the other of said one and said another positions, a first electrical switch mounted to said housing assembly and having open and closed first circuit conditions, said first switch having a first actuating plunger movable outwardly for placing said switch in one of said circuit conditions and movable inwardly for placing said first switch in the other of said circuit conditions, said first plunger located at said first preselected location in said housing assembly and in engagement with said first shift rod and moving outwardly into said first slot with said first slot at said first preselected location and moving inwardly with said first slot at said first different location, and a second electrical switch mounted to said housing assembly and having open and closed second circuit conditions, said second switch having a second actuating plunger movable outwardly for placing said second switch in one of said second circuit conditions and movable inwardly for placing said second switch in the other of said second circuit conditions, said second plunger located at said second preselected location in said housing assembly and in engagement with said second shift rod and moving outwardly into said second slot with said second slot at said second preselected location and moving inwardly with said second slot at said second different location.

4. In an automotive vehicle having a set of front and a set of rear wheels drivable from a source of power, the combination comprising: a transfer case for selectively coupling the sets of front and rear wheels to the source of power, said transfer case including a housing assembly, first coupling means disposed in said housing assembly for transmitting power to the rear wheels in one of two gear ratios, second coupling means disposed in said housing assembly for transmitting power to the set of front wheels in one of two gear ratios, a first shift rod slidably supported in said housing assembly and selectively movable into a first position for connecting said first coupling means to the source of power in one gear ratio and to a second position for connecting said first coupling means to the source of power in the other gear ratio and into a third position for connecting said first coupling means from the source of power, said first shift rod having a first pair of slots movable to a first preselected location in said housing assembly with said first shift rod in said first and said second positions, respectively, and with said first pair of slots disposed at first different locations with said first shift rod in said third position, a second shift rod slidably supported in said housing assembly and selectively movable into one position for connecting said second coupling means to the source of power in one gear ratio and into another position for connecting said second coupling means to the source of power in the other gear ratio and into a final position for disconnecting said second coupling means from the source of power, said second shift rod having a second pair of slots movable to a second preselected location in said housing assembly with said second shift rod in said one and said another positions, respectively, and with said second pair of slots disposed at second different locations with said second shift rod in said final position, a first electrical switch mounted to said housing assembly and having open and closed first circuit conditions, said first switch having a first actuating plunger movable outwardly for placing said first switch in one of said first circuit conditions and movable inwardly for placing said first switch in the other of said first circuit conditions, said first plunger located at said first preselected location in said housing assembly and in engagement with said first shift rod and moving outwardly with each of said first pair of slots at said first preselected location and moving inwardly with said first pair of slots at said first different locations, and a second electrical switch mounted to said housing assembly and having open and closed second circuit conditions, said second switch having a second actuating plunger movable outwardly for placing said second switch in one of said second circuit conditions and moveable inwardly for placing said second switch in the other of said second circuit conditions, said second plunger located at said second preselected location in said housing assembly and in engagement with said second shift rod and moving outwardly with each of said second slots at said second preselected location and moving inwardly with said second pair of slots at said second different locations.

5. In an automotive vehicle having a set of front and a set of rear wheels drivable from a source of power, the combination comprising: a transfer case for selectively coupling the sets of front and rear wheels to the source of power, said transfer case including a housing assembly, first coupling means disposed in said housing assembly for transmitting power to the rear wheels in one of two gear ratios, second coupling means disposed in said housing assembly for transmitting power to the set of front wheels in one of two gear ratios, a first shift rod slidably supported in said housing assembly and selectively movable into a first position for connecting said first coupling means to the source of power in one gear ratio and to a second position for connecting said first coupling means to the source of power in the other gear ratio and into a third position for disconnecting said first coupling means from the source of power, said first shift rod having a first pair of slots movable to a first preselected location in said housing assembly with said first shift rod in said first and said second positions, respectively, and with said first pair of slots disposed at first different locations with said first shift rod in said third position, a second shift rod slidably supported in said housing assembly and selectively movable into one position for connecting said second coupling means to the source of power in one gear ratio and into another position for connecting said second coupling means to the source of power in the other gear ratio and into final position for disconnecting said second coupling means from the source of power, said second shift rod having a second pair of slots movable to a second preselected location in said housing assembly with said second shift rod in said one and said another positions, respectively, and with said second pair of slots disposed at second different locations with said second shift rod in said final position, a first electrical switch mounted to said housing assembly and having open and closed circuit conditions, said first switch having a first actuating plunger movable outwardly for placing said first switch in an opened circuit condition and movable inwardly for placing said first switch in a closed circuit condition, said first plunger located at said first preselected location in said housing assembly and in engagement with said first shift rod and moving outwardly with each of said first pair of slots at said first preselected location and moving inwardly with said first pair of slots at said first different locations, and a second electrical switch mounted to said housing assembly and having open and closed circuit conditions, said second switch having a second actuating plunger movable outwardly for placing said second switch in a closed circuit condition and movable inwardly for placing said second switch in an opened circuit condition, said second plunger located at said second preselected location in said housing assembly and in engagement with said second shift rod and moving outwardly with each one of said second slots at said second preselected location and moving inwardly with said second pair of slots at said second different locations.

6. In an automotive vehicle having a set of front and a set of rear wheels drivable from a source of power, the combination comprising: a transfer case selectively coupling the front and rear wheels to a source of power, said transfer case including a housing assembly, first coupling means disposed in said housing assembly for transmitting power to one of the sets of front and rear wheels, second coupling means disposed in said housing assembly for transmitting power to the other of the sets of front and rear wheels, a first shift rod slidably supported in said housing assembly and selectively movable into a first position for connecting said first coupling means to the source of power and being selectively movable into a second position for disconnecting said first coupling means from the source of power, a second shift rod slidably supported in said housing assembly and selectively movable into one position for connecting said second coupling means to the source of power and being selectively movable into another position for disconnecting said second coupling means from the source of power, a first electrical switch mounted to said housing assembly and having open and closed first circuit conditions, said first switch having a first actuating plunger movable outwardly for placing said first switch in one of said first circuit conditions and movable inwardly for placing said first switch in the other of said first circuit conditions, said first plunger located at one end of said first shift rod and in engagement therewith and moving outwardly with said first shift rod in one of said first and said second positions and movable inwardly with said first shift rod in the other of said first and said second positions, a second electrical switch mounted to said housing assembly and having open and closed second circuit conditions, said second switch having a second actuating plunger movable outwardly for placing said second switch in one of said second circuit conditions and movable inwardly for placing said second switch in the other of said second circuit conditions, said second plunger located at one end of said second shift rod and in engagement therewith and moving outwardly with said second shift rod in one of said one and another positions and moving inwardly with said second shift rod in the other of said one and said another positions.

7. In an automotive vehicle having a set of front and a set of rear wheels drivable from a source of power, the combination comprising: a transfer case selectively coupling the front and rear wheels to a source of power, said transfer case including the housing assembly, first coupling means disposed in said housing assembly for transmitting power to one of the sets of front and rear wheels in one of two gear ratios, second coupling means disposed in said housing assembly for transmitting power to the other of the sets of front and rear wheels in one of two gear ratios, a first shift rod slidably supported in said housing assembly and selectively movable into a first position for connecting said first coupling means to the source of power in one gear ratio and to a second position for connecting said first coupling means to the source of power in the other gear ratio and into a third position for disconnecting said first coupling means from the source of power, a second shift rod slidably supported in said housing assembly and selectively movable into one position for connecting said second coupling means to the source of power in one gear ratio and another position for connecting said second coupling means from the source of power in the other gear ratio and into a final position for disconnecting said first coupling means from the source of power, a first electrical switch mounted to said housing assembly and having open and closed first circuit conditions, said first switch having a first actuating plunger movable for placing said first switch in each said first circuit conditions, said first plunger located at one end of said first shift rod and engageable therewith and movable responsively to movement of said first shift rod with said first plunger placing said first switch into one of said first circuit conditions with said first shift rod in each of said first and said second positions and with said first plunger placing said first switch into the other of said first circuit conditions with said first shift rod in said third position, a second electrical switch mounted to said housing assembly and having open and closed second circuit conditions, said second switch having a second actuating plunger movable for placing said second switch in each of said second circuit conditions, said second plunger located at one end of said second shift rod and engageable therewith and movable responsively to movement of said second shift rod with said second plunger placing said second switch into one of said second circuit conditions with said second shift rod in each of said one and said another positions and with said second plunger placing said second switch into the other of said second circuit conditions with said second shift rod in said final position.

8. In an automotive vehicle having a set of front and a set of rear wheels drivable from a source of power, the combination comprising: a transfer case selectively coupling the front and rear wheels to a source of power, said transfer case including the housing assembly, first coupling means disposed in said housing assembly for transmitting power to one of the sets of front and rear wheels in one of two gear ratios, second coupling means disposed in said housing assembly for transmitting power to the other of the sets of front and rear wheels in one of two gear ratios, a first shift rod slidably supported in said housing assembly and selectively movable into a first position for connecting said first coupling means to the source of power in one gear ratio and to a second position for connecting said first coupling means to the source of power in the other gear ratio and into a third position for disconnecting said first coupling means from the source of power, a second shift rod slidably supported in said housing assembly and selectively movable into one position for connecting said second coupling means to the source of power in one gear ratio and another position for connecting said second coupling means from the source of power in the other gear ratio and into a final position for disconnecting said first coupling means from the source of power, a first electrical switch mounted to said housing assembly and having open and closed first circuit conditions, said first switch having a first actuating plunger movable for placing said first switch in each said first circuit conditions, said first plunger located at one end of said first shift rod and engageable therewith and movable responsively to movement of said first shift rod with said first plunger placing said first switch into an open circuit condition with said first shift rod in each of said first and said second positions and with said first plunger placing said first switch into a closed circuit condition with said first shift rod in said third position, a second electrical switch mounted to said housing assembly and having open and closed second circuit conditions, said second switch having a second actuating plunger movable for placing said second switch in each of said second circuit conditions, said second plunger located at one end of said second shift rod and engageable therewith and movable responsively to movement of said second shift rod with said second plunger placing said second switch into a closed circuit condition with said second shift rod in each of said one and said another positions and with said second plunger placing said second switch into an open circuit condition with said second shift rod in said final position.

References Cited by the Examiner
UNITED STATES PATENTS

| | | | |
|---|---|---|---|
| 1,690,956 | 11/1928 | Tokuhisa. | |
| 2,397,587 | 4/1946 | Armantrout | 180—44 X |
| 2,475,803 | 7/1949 | Probst | 74—333 |
| 2,715,217 | 8/1955 | Russell | 340—52 |

A. HARRY LEVY, *Primary Examiner.*